No. 735,424. PATENTED AUG. 4, 1903.
F. W. TAYLOR & H. L. GANTT.
METHOD OF DETERMINING AND REGULATING THE TEMPERATURE
OF HEATED ARTICLES OR RECEPTACLES.
APPLICATION FILED NOV. 16, 1900.
NO MODEL. 2 SHEETS—SHEET 1.
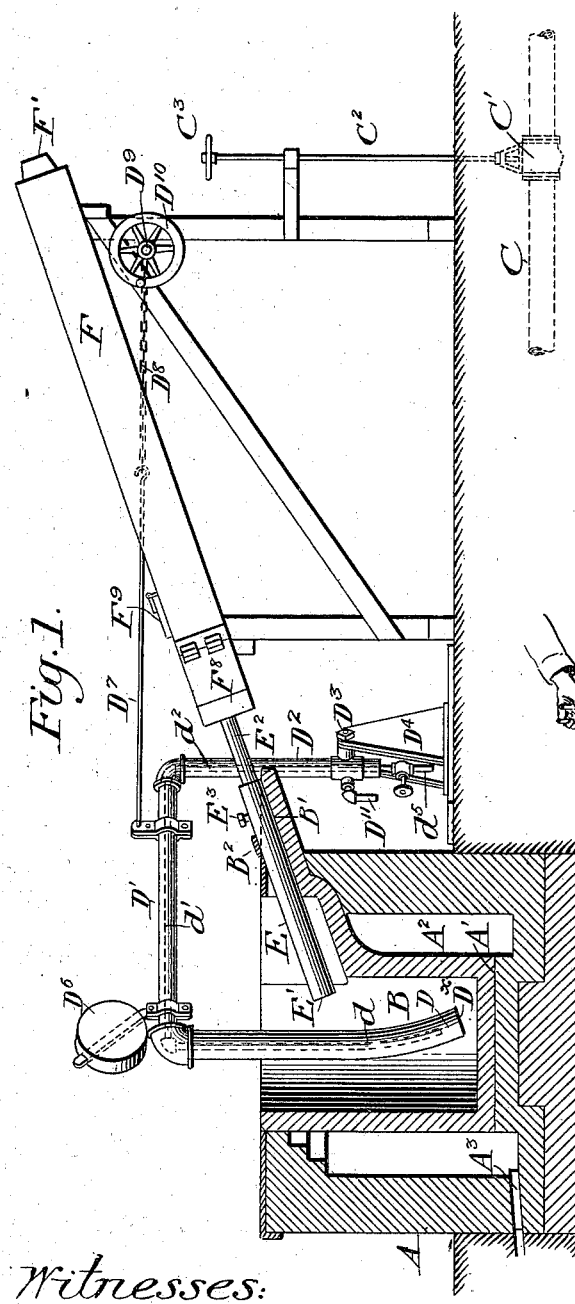
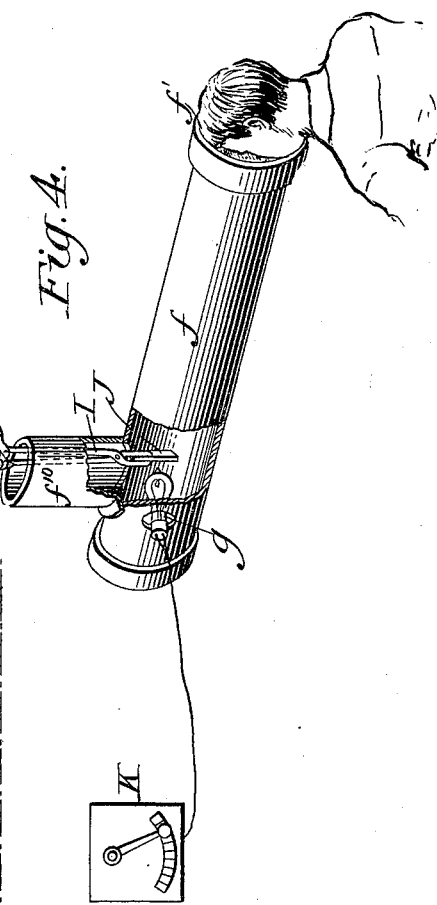
Witnesses:
Inventors.

No. 735,424. PATENTED AUG. 4, 1903.
F. W. TAYLOR & H. L. GANTT.
METHOD OF DETERMINING AND REGULATING THE TEMPERATURE
OF HEATED ARTICLES OR RECEPTACLES.
APPLICATION FILED NOV. 16, 1900.
NO MODEL. 2 SHEETS—SHEET 2.
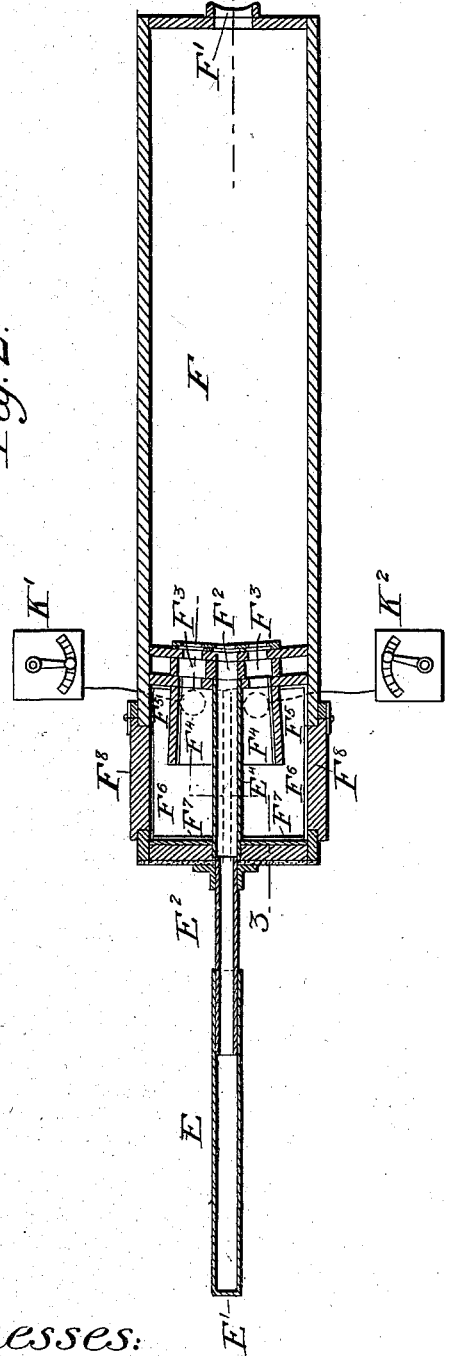
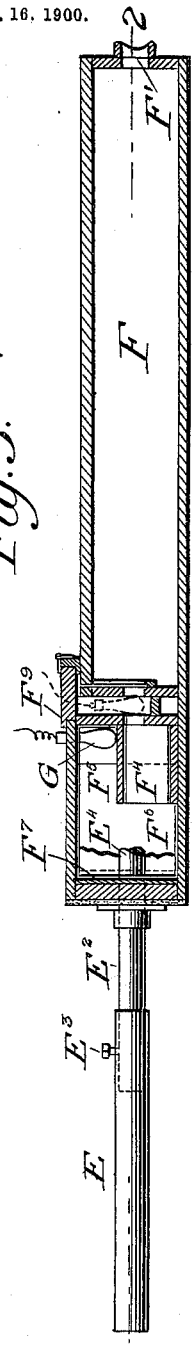

No. 735,424. Patented August 4, 1903.

UNITED STATES PATENT OFFICE.

FREDERICK W. TAYLOR AND HENRY L. GANTT, OF SOUTH BETHLEHEM, PENNSYLVANIA, ASSIGNORS, BY MESNE ASSIGNMENTS, TO MORSE THERMO-GAGE CO., OF TRUMANSBURG, NEW YORK.

METHOD OF DETERMINING AND REGULATING THE TEMPERATURE OF HEATED ARTICLES OR RECEPTACLES.

SPECIFICATION forming part of Letters Patent No. 735,424, dated August 4, 1903.

Application filed November 16, 1900. Serial No. 36,682. (No model.)

*To all whom it may concern:*

Be it known that we, FREDERICK W. TAYLOR and HENRY L. GANTT, citizens of the United States of America, residing in South Bethlehem, in the county of Northampton, in the State of Pennsylvania, have invented a certain new and useful Improvement in Methods of Determining and Regulating the Temperature of Heated Articles or Receptacles, of which the following is a true and exact description, reference being had to the accompanying drawings, which form a part thereof.

In an application for Letters Patent of the United States filed by us October 21, 1899, Serial No. 734,289, we have described a new method of determining the temperature of a heated article, chamber, or receptacle and of regulating such temperature to a determined standard, said method being particularly useful in carrying out the processes of annealing, tempering, or the like, where it is desirable that the substances undergoing treatment should be heated to a uniform temperature in order that they may all be affected by the treatment in the same degree. While the method may be utilized for determining the exact temperature of an article or chamber, it is particularly adapted for ascertaining whether or not a certain determined temperature has been reached and for regulating the temperature to such determined point.

In our application above referred to we have described and claimed our invention as consisting, essentially, in comparing the color and intensity of the light emitted from an object or medium the color of which emitted light has an ascertained relation to temperature with the color and intensity of the emitted light from the substance under observation when such substance is at a certain predetermined temperature. We have also described in said application that the standardized medium employed in our method may be an incandescent body—such, for instance, as a carbon filament brought to incandescence by the electric current or that it may be light transmitted through and emitted from a translucent medium—such, for instance, as colored glass or a colored solution contained between transparent walls. The present application relates specifically to the direct comparison of the substances under observation with an incandescing body under the conditions and for the purposes hereinafter described.

While our method can be successfully practiced in many cases by directly observing the tool or other object being treated in comparison with the emitted light and the standardized medium, it is most usefully employed for ascertaining the temperature of a furnace-chamber or fused metallic bath in which the tool or other object undergoing treatment is heated, and in such case we prefer to carry our process into operation by inserting in the chamber or receptable the closed end of a tube which is raised to the temperature of the chamber, such temperature being ascertained by observing the color and intensity of the light emitted by the heated end of the tube through the open end of the tube and in comparison with the emitted light from the standardized medium, and our method is particularly useful in the last-mentioned modification when used in connection with means whereby the temperature of the chamber or bath can be regulated, so as to bring it gradually into exact accordance with the light of the standardized medium which corresponds to the desired temperature.

Our method depends upon the fact that when substances, particularly metals, are heated above a certain limit they emit colored light, which changes as the temperature increases or decreases, the color and intensity of the light varying with an exact relation to the temperature, so that the appearance of the heated object affords at all times a perfectly accurate means of determining its temperature, provided only the relationship of the colored light to temperature is known. It being ascertained, therefore, that steel, for instance, at a certain temperature emits a light of a certain color and quality, it is possible to ascertain with exactness when steel has reached that point by observing it in comparison with a standardized colored light known to correspond with a determined temperature. Furthermore, if variously-colored lights are employed for purposes of comparison, which are capable of being varied or brought successively into view at the will of the operator, it is obvious that the temperature of the steel can be ascertained by observing with which standardized colored light it corresponds. While, however, the relationship of colored light emitted from heated objects to temperature is well understood in the art, the observation of the color of heated articles as a means of ascertaining their temperature has depended, as heretofore practiced, upon the experience and memory of trained observers and has therefore been little better than a rule of thumb, for while it has been attempted to provide a visual scale consisting of strips of colored paints or inks and bearing an approximate relationship to the heat colors such scales are far from accurate, and, among other reasons, primarily because the colored lights reflected from them entirely lack the glowing appearance characteristic of incandescent bodies, and are therefore of a quite different character from the emitted light given out by the heated object to be observed.

We have discovered that colored light emitted directly from the incandescent standard, as well as light emitted by transmission through a translucent colored medium, bears a closer relationship to the heat colors than any lights reflected from colored substances and that by comparing such emitted lights with the lights of the heated object under treatment by bringing both lights simultaneously to the eye the colors will be so exactly of the same character that the colored heat of the object under treatment can be accurately determined even by comparatively unskilful and inexperienced observers.

As heretofore indicated, our invention, as broadly expressed in the application referred to, consists in comparing the color and quality of the light emitted from a highly-heated object, the temperature of which is to be ascertained, with the glowing colored light emitted from a standardized medium simultaneously brought into vision. The employment in this connection of an incandescent substance as the standardized medium—such, for instance, as the incandescent filament of an electric lamp—is the particular subject of the present application, for which reason the following description will be correspondingly limited to this last-mentioned particular embodiment of the invention.

It is to be noted that our method depends upon a comparison of the color of the emitted lights as well as upon a comparison of light intensity or the amount of illumination.

We are aware that pyrometers have been constructed in which provision is made for a comparison between the light emitted from an object highly heated and a light or lights of standardized intensity, from both of which lights the element of color is eliminated; but this method is open to several objections and cannot compare in reliability or in ease of observation with our method based, primarily, on a comparison of color in the light emitted from the object under observation and a standardized medium.

Reference is to be had to the drawings, in which we have illustrated apparatus suitable for the practice of our method, and in which—

Figure 1 is a side elevation, partly in section, of a lead-bath provided with means for heating and cooling its contents and with a pyrometer embodying our method. Fig. 2 is a horizontal section through the pyrometer, taken on the line 2 2 of Fig. 3. Fig. 3 is a vertical section through the pyrometer on the irregular line 3 3 of Fig. 2. Fig. 4 is a perspective view of a modified form of pyrometer also adapted for use with our method.

A indicates the furnace-chamber, having a platform A' at its bottom, upon which is supported a lead-pot, (indicated at B,) $A^2$ indicating the flue passing around the lead-pot from a furnace (not shown) to a stack. (Also not shown.)

$A^3$ indicates a vent for the escape of lead in case of the breakage of the lead-pot.

The lead-pot B is made, as shown, with a lateral extension B' to give support and ready entrance to the tube E, hereinafter described, $B^2$ indicating a clamp for holding the tube E in position.

C indicates an air-blast pipe leading to the furnace, (not shown,) C' indicating a regulating-valve, $C^2$ a valve-stem, and $C^3$ a hand-wheel for operating the stem and valve.

D D' $D^2$ indicate pipes constituting a conduit, the end of the pipe D being closed and the angular system of conduits being pivoted at $D^3$ upon standards $D^4$ and connected with an escape-pipe $D^{11}$, as shown. $d$ $d'$ $d^2$ indicate a pipe system of smaller diameter passing through the pipes D D' $D^2$ and connecting with a water-supply pipe $d^5$. The water being turned on, passes through the pipes $d^2$ $d'$ $d$ into the end of the pipe D, thence back through said pipe D through pipes D' and $D^2$ to the outlet $d^5$.

$D^6$ is a weight tending to hold the pipes in the position shown in Fig. 1.

$D^7$ is a rod connecting with a chain $D^8$, which winds on a spindle $D^9$, turned by a hand-wheel $D^{10}$, and by means of which the pipe system can be rocked backward on its pivot $D^3$ and withdrawn in whole or in part from the lead-pot B.

E is a closed-ended tube projecting into the melted lead in the pot B and having its open end projecting outside of said pipe, as shown.

E', Fig. 1, indicates the closed end of the tube.

$E^2$ is a tube telescoping into the open end of the pipe E and secured, as shown, to the end of the pyrometer-box F. This box has a sight-aperture F' at its front end and at its rear end partitions, in which are formed a central aperture or chamber $F^2$ in line with the pipes $E^2$ and E and connected therewith by a separate pipe-section $E^4$. On each side of this central aperture are lateral apertures or chambers $F^3$ $F^3$, to which access is afforded through the top of the box or tube by a door $F^9$. In rear of the chambers $F^3$ $F^3$ are formed in the pyrometer-box light-chambers $F^6$, into which project shield-boxes $F^4$ $F^4$, at the sides of which are the chambers $F^5$ $F^5$, in which chambers are situated the lights, which may be conveniently incandescent electric lights G, as shown in Fig. 3.

$F^7$ indicates a reflecting-screen in the light-chambers, which should be of varying character in accordance with the intensity of the light required, ranging from a white porcelain, where a very intense light is required, to a black velvet, where a light of low intensity is desirable. Access to the light-chambers is afforded by means of doors $F^8$ $F^8$.

K' $K^2$ indicate rheostats, by means of which the current transmitted through the filaments of the electric lamps can be varied at will, with a consequent variation in the intensity of the light emitted from the chambers.

In using the apparatus above described the pot B is kept full of melted lead, in which is immersed the closed end E' of the tube E, said closed end of the tube attaining precisely the temperature of the lead and having a colored glow visible through the open end of the tube corresponding with the degree of temperature. Where both chambers $F^6$ $F^6$ are used, the light emitted from one of said chambers should correspond to a slightly higher temperature than that desired, while the light transmitted from the other chamber should correspond to a slightly lower temperature than that desired, so that the observer, looking through the sight-opening F', sees at the same time the color of light emitted from the end of the tube E and the color of the light emitted from the lateral chambers $F^3$ and is able to nicely gage the approach of the heat of the end of the tube E to the desired temperature. In order to control the temperature of the bath, the observer has conveniently accessible the hand-wheel $C^3$, by means of which he can regulate the draft of the furnace heating the lead-pot and also the hand-wheel $D^{10}$, by which he controls the cooling-tube D, plunging it into or withdrawing it from the lead-bath as it is desired to cool the bath or permit its temperature to increase. By one or both of these manipulations it will be evident that the observer can rapidly and nicely regulate the temperature of the bath until it coincides with the desired temperature indicated by the light-emitting medium. Obviously when the bath has attained the desired temperature a tool or other article immersed in it will be heated to exactly the point desired.

As described in our application filed October 23, 1899, Serial No. 734,456, and as illustrated in dotted lines in Fig. 3 herein, it will be understood that the incandescent lamps G may be located directly in the chambers $F^3$, if desired, instead of in the chambers $F^6$.

In the modified form of apparatus shown in Fig. 4 the pyrometer box or tube is indicated at $f$, the sight-opening at $f'$, and at the same point the tube is accessible by means of a lateral opening $f^{10}$, through which a heated tool or other object, as indicated at J, can be inserted and held by means of tongs I alongside of the incandescent electric lamp $g$, by which the light is generated, K indicating a rheostat, by means of which the current transmitted through the filament of the lamp can be varied at will, with a consequent variation in the color and intensity of the light emitted from the filament. This furnishes a convenient way of determining the temperature of a heated object by varying the color and intensity of the light emitted from the filament until it coincides with that of the object, the relationship of the current to temperature having been previously determined.

Having thus described our invention, what we claim is—

1. The method of gaging the temperature of a substance when heated to incandescence, consisting in comparing the degree of incandescence of said substance with a standard which is incandescent simultaneously therewith and incandescent to a degree corresponding to the incandescence of said substance when heated to the desired temperature.

2. The method of gaging the temperature of a material which becomes incandescent when heated, consisting in comparing said material heated to an incandescent state with a heated substance which is incandescent simultaneously therewith and capable of presenting a like incandescent appearance, and producing in said substance and material a certain like degree of incandescence corresponding to a certain degree of temperature.

FREDERICK W. TAYLOR.
HENRY L. GANTT.

Witnesses:
 JAMES HENNESY,
 DAVID C. FENNER.